(12) United States Patent
Chong et al.

(10) Patent No.: US 10,402,763 B2
(45) Date of Patent: Sep. 3, 2019

(54) TOTAL MANUFACTURING PLANNING MANAGEMENT CONTROL SYSTEM

(71) Applicant: LENOVO ENTERPRISE SOLUTIONS (SINGAPORE) PTE. LTD., New Tech Park (SG)

(72) Inventors: Celine Yin Cheng Chong, Singapore (SG); Kenneth A. Scea, Poughkeepsie, NY (US); Xunzhen Wu, Shenzhen (CN); Xin Yao, Shenzhen (CN)

(73) Assignee: LENOVO ENTERPRISE SOLUTIONS (SINGAPORE) PTE. LTD, Singapore (SG)

( * ) Notice: Subject to any disclaimer, the term of this patent is extended or adjusted under 35 U.S.C. 154(b) by 962 days.

(21) Appl. No.: 14/566,922

(22) Filed: Dec. 11, 2014

(65) Prior Publication Data

US 2016/0171411 A1 Jun. 16, 2016

(51) Int. Cl.
*G06Q 10/06* (2012.01)

(52) U.S. Cl.
CPC ... *G06Q 10/06315* (2013.01); *G06Q 10/0637* (2013.01)

(58) Field of Classification Search
CPC ........ G06Q 30/02; G06Q 10/06; G06Q 10/04; G06Q 10/10; G06Q 30/0202; G06Q 30/06;
(Continued)

(56) References Cited

U.S. PATENT DOCUMENTS 7,835,952 B2 11/2010 Tozawa et al.
8,306,645 B2 11/2012 Giebels
(Continued)

FOREIGN PATENT DOCUMENTS

EP 0425403 A2 5/1991
EP 0467584 A2 1/1992
(Continued)

OTHER PUBLICATIONS

Wikipedia, "Production part approval process," Wikipedia: the Free Encyclopedia, Last Modified on Sep. 25, 2014, p. 1-6, http://en.wikipedia.org/wiki/Production_part_approval_process, Accessed on Sep. 30, 2014.

*Primary Examiner* — Jamie H Austin
(74) *Attorney, Agent, or Firm* — Kuzler Bean & Adamson; Bruce R. Needham

(57) ABSTRACT

Managing a manufacturer's business plan in real-time, a computer receives real-time quality data associated with a measure of component quality from supplier of the component incorporated in a manufacturer product. The computer receives real-time quality data associated with a measure of product quality from the manufacturer. The computer determines a statistical trend in the received supplier real-time quality data. If supplier real-time quality data exceeds a quality target metric for the supplier, exceeds a quality target metric for the component, or the statistical trend exceeds a threshold value, the computer analyzes financial impact to the manufacturer using supplier real-time quality data, manufacturer real-time quality data, historical quality data of supplier and manufacturer, and manufacturer's business plan. Based on analysis results indicating financial impact exceeding a threshold, the computer externalizes a warning, externalizes recommended changes to manufacturer's business plan, and changes manufacturer's business plan with analysis recommended changes.

20 Claims, 3 Drawing Sheets

(58) Field of Classification Search
CPC ............. G06Q 40/06; G06Q 10/06375; G06Q 30/0201; G06Q 10/0637; G06Q 40/00; G06Q 30/0603; G06Q 30/0625; G06Q 30/0643; G06Q 30/08; G06Q 30/0623; G06Q 50/04; G06Q 10/06315; G06Q 10/06316; G06Q 10/06313; G06Q 10/06311; G06Q 50/06; G06Q 10/087; G06Q 50/02; G06Q 50/01; G06Q 10/0631; G06Q 10/067; G06Q 30/0635; G06Q 50/28; G06Q 10/0633; G06Q 10/103; G06Q 30/018; G06Q 30/0633; G06Q 10/101; G06Q 30/0611; G06Q 30/0613; G06Q 50/08; G06Q 10/00; G06Q 10/063114; G06Q 10/06314; G06Q 10/08; G06Q 10/083; G06Q 10/0833; G06Q 10/0875; G06Q 30/0206; G06Q 30/0282; G06Q 30/0641; G06Q 50/12; G06Q 10/043; G06Q 10/063; G06Q 10/063112; G06Q 10/063118; G06Q 10/06312; G06Q 10/0635; G06Q 10/06398; G06Q 10/0834; G06Q 10/105; G06Q 10/107; G06Q 10/109; G06Q 10/1093; G06Q 10/20; G06Q 20/12; G06Q 20/145; G06Q 20/322; G06Q 20/3278; G06Q 30/01; G06Q 30/0207; G06Q 30/0255; G06Q 30/04; G06Q 30/0609; G06Q 30/0621; G06Q 30/0631; G06Q 40/025; G06Q 40/12; G06Q 40/125; G06Q 50/10; G06Q 50/14; G06Q 50/16; G06Q 50/18; G06Q 50/188; G06Q 50/26; G06Q 50/265; G06Q 50/30
USPC ..................... 705/7.25, 7.12, 7.13, 7.23, 7.26
See application file for complete search history.

(56) References Cited

U.S. PATENT DOCUMENTS

| | | | | |
|---|---|---|---|---|
| 2002/0078403 | A1* | 6/2002 | Gullo | G06F 11/008 714/37 |
| 2003/0090509 | A1* | 5/2003 | Tetambe | G06F 17/30893 715/738 |
| 2005/0159973 | A1* | 7/2005 | Krause | G06Q 10/06 700/109 |
| 2006/0047354 | A1* | 3/2006 | Daferner | G06Q 10/04 700/108 |
| 2008/0140688 | A1* | 6/2008 | Clayton | G06Q 10/06 |
| 2008/0286885 | A1* | 11/2008 | Izikson | G05B 21/02 438/7 |
| 2013/0346160 | A1* | 12/2013 | Dunst | G06Q 30/0217 705/7.36 |
| 2015/0253767 | A1* | 9/2015 | Heinecke | G06Q 10/0631 700/105 |

FOREIGN PATENT DOCUMENTS

| | | |
|---|---|---|
| EP | 1310845 B1 | 11/2005 |
| JP | 2000099108 A | 4/2000 |

\* cited by examiner

TOTAL MANUFACTURING PLANNING MANAGEMENT CONTROL SYSTEM

BACKGROUND

The present disclosure relates generally to business intelligence and more particularly to manufacturing planning based on resource quality.

A manufacturing planning management system uses business intelligence to plan and control all aspects of manufacturing, including managing materials, scheduling machines and people, and coordinating suppliers and key customers. Effective manufacturing planning management systems coordinate supply chains across company boundaries and continuously adapt and respond to changes in the company environment, strategy, customer requirements, particular problems, and new supply chain opportunities.

SUMMARY

Embodiments of the present invention disclose a method, computer program product, and system for managing a manufacturer's business plan in real-time. A computer receives real-time quality data from a supplier producing a component incorporated in a product produced by the manufacturer, the real-time quality data associated with a measure of an aspect of quality of the component. The computer receives real-time quality data from the manufacturer producing the product, the real-time quality data associated with a measure of an aspect of quality of the product. The computer determines a statistical trend in the received real-time quality data from the supplier and based on one or more of: determining that the real-time quality data received from the supplier exceeds a quality target metric for the supplier, that the real-time quality data received from the supplier exceeds a quality target metric for the component produced by the supplier, and that the determined statistical trend exceeds a threshold value, the computer analyzes a financial impact to the manufacturer using the real-time quality data received from the supplier, the real-time quality data received from the manufacturer, historical supplier quality data, historical manufacturer quality data, and the manufacturer's business plan. Based on analysis results indicating a financial impact exceeding a threshold, the computer externalizes a warning, externalizes analysis recommended changes to the manufacturer's business plan, and changes the manufacturer's business plan with the analysis recommended changes.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
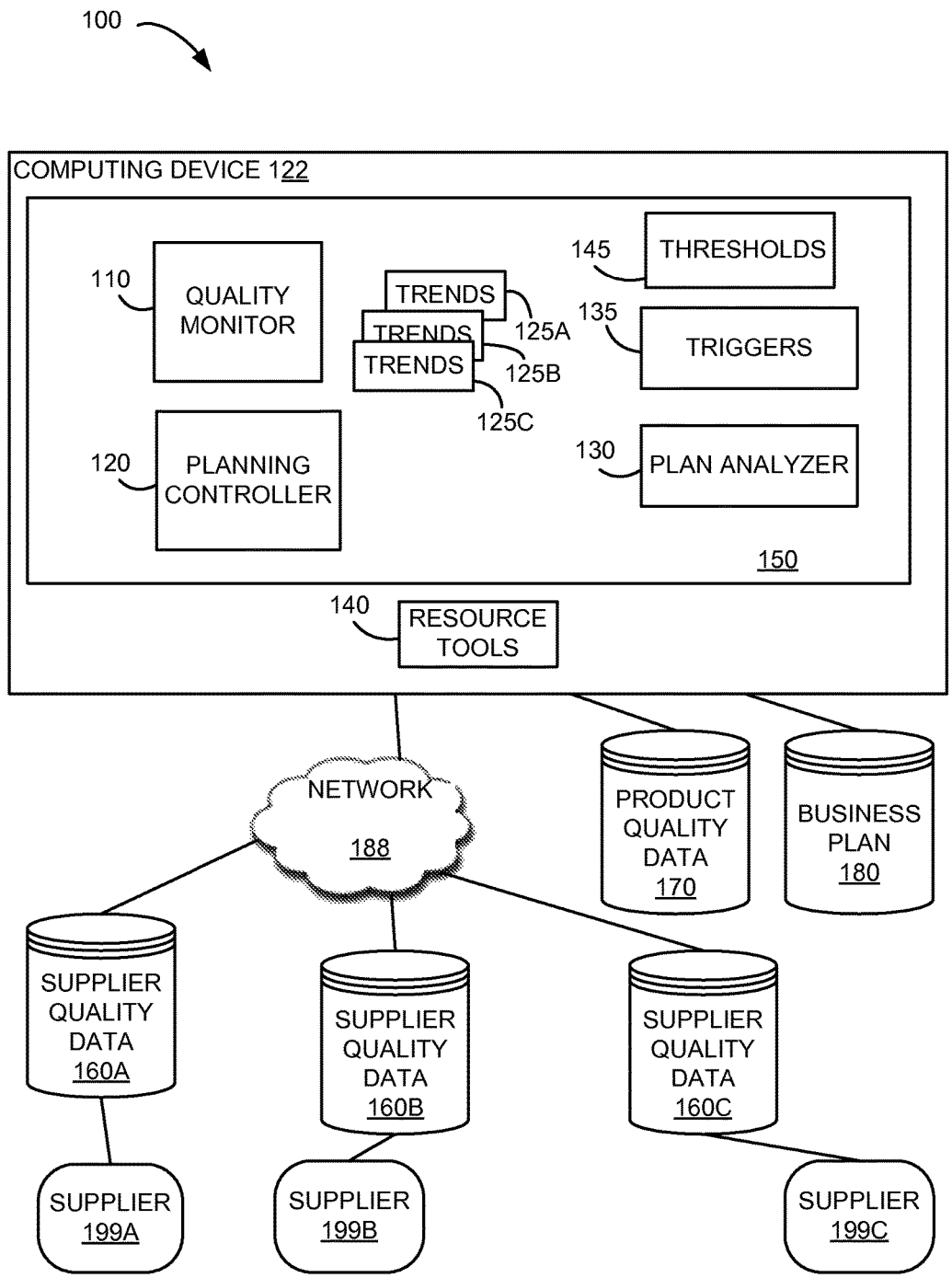
FIG. 1 illustrates a functional block diagram of an exemplary total manufacturing planning management system environment, in accordance with an embodiment of the present disclosure.

Business intelligence is the process of delivering information about business operations for business planning. Real-time business intelligence delivers that information as it occurs, with near to zero latency whenever it is required. Real-time business planning not only supports the classic strategic functions of data warehousing for deriving information and knowledge from past enterprise activity, but also provides real-time tactical support to drive enterprise actions that react immediately to events as they occur.

Traditional business intelligence presents historical data for analysis and planning. Real-time business intelligence correlates real-time business events with historical data to detect problems or opportunities automatically. This automated analysis capability enables corrective actions to be initiated and/or business rules to be adjusted to optimize business processes. Monitoring business operational information in real-time allows entire processes to be tracked and the process metrics (latency, completion/failed ratios, etc.) to be viewed, compared with warehoused historical data, and analyzed in real-time. The real-time analysis allows threshold detection, alerts, and feedback loops to be integrated into the process execution systems.

A business plan is only as good as the information used to create the plan. Plans created from inaccurate or outdated information may adversely affect a manufacturer's profitability. For example, inventory plans may be based on such factors as a forecast product demand, production costs, inventory costs, lead time required to obtain the inventory, working hours, capacity, inventory levels, available storage space, and parts supply. These factors may be quantified to create an optimum manufacturing production schedule that depends on the planned inventory being available when it is needed. Manufacturing production based on an outdated inventory plan may adversely affect a manufacturer's profitability when expected inventories are not available when needed.

Many manufacturers require components from outside suppliers. Business plans for such manufacturers may be created using the expected component quantities and the scheduled availability contracted with the suppliers. These business plans may drive inventory levels, manufacturing inventory, and inventory stocking. These business plans may become outdated if supplier quantity, quality, cost, or scheduled delivery dates change.

Manufacturing inventory plans, for example, may be affected by a supplier's inability to deliver components in the contracted quantities or with the contracted quality. Currently, manufacturers may measure, follow-up, and compare actual results of a supplier's production against the latest business plan. If actual supplier results, such as completion time, cost, and customer service, differ from those planned, the manufacturer may take appropriate actions to bring the results back to plan or may modify their plan. This reactionary plan adjustment may occur after the manufacturer's production has already been affected by the supplier problems.

Various embodiments of the present disclosure may monitor not only the business operational information of the manufacturer in real-time, but may also monitor the operational information of the supplier in real-time. Various embodiments may recognize potential supplier problems and may proactively issue warnings and adjust the manufacturer's business plans to minimize the effect of supplier problems on production.

Embodiments of the present disclosure provide a "total manufacturing planning management" (TMPM) system that monitors the quality of contracted supplier components during component production and test, at the supplier. A TMPM system may allow real-time updates to business plans and schedules in response to problems in the monitored supplier's component quality. A supplier quality problem may result in smaller projected yields, higher costs, and/or delivery delays. Real-time business plan updates, provided by embodiments of the present disclosure may keep the manufacturer's production running when supplier problems arise by, for example, switching suppliers, stocking components from alternate suppliers, or reengineering the components. A TMPM system may integrate supplier data, such as quality metrics, cost, historical production yields, first pass article yields, first pass article quality, and quality trends, with manufacturing data, such as first pass product quality, and first pass product yields. The TMPM system may anticipate risks to inventory supply, anticipate factors that may affect the business plans, and update any affected business plans and manufacturing production schedules accordingly.

An exemplary manufacturer's TMPM system may assess business plan risks, for example, in inventory supply. Inventory supply plans may be at risk when, for example, the manufacturer introduces engineering changes, new product designs, or new manufacturing materials into its business plans. Business plan changes such as these may create the need for new manufacturing processes, new components to be supplied, and new suppliers for those components. New components, whether from an existing supplier or a new supplier may encounter unanticipated quality problems during first pass article manufacture that, in various embodiments, may trigger a TMPM system to anticipate added risk in the manufacturer's production schedule and cost. The TMPM system may modify the manufacturer's business plan, to mitigate the anticipated risks.

A TMPM system may also recognize trends that signal quality problems with supplier components and may modify the business plan to prevent faulty components from entering production, thereby preventing rework at the manufacturer and saving the manufacturer time and money. By trending a supplier's component quality to anticipate a supplier's inability to deliver the expected component on time or in sufficient quantity, a TMPM system may modify the business plan to prevent a production shut down due to inventory shortage. A TMPM system that anticipates supplier problems may also boost a manufacturer's customer satisfaction by preventing faulty components from delaying the manufacturer's product and preventing faulty components from entering the manufacturer's product.

Receiving quality and yield data, in real-time, from the supplier, as the supplier is building and testing components, may allow a TMPM system to anticipate poor quality or insufficient component supplies, to adjust the manufacturer's business plan, in real-time, and to adjust inventory and manufacturing schedules, in real-time, saving the manufacturer time, money and customer satisfaction.

Although the exemplary embodiments in this disclosure describe a manufacturer's inventory planning using supplier quality information, a TMPM system may be advantageously utilized by any planning system or planning application where real-time supplier information may be trended and real-time triggers may be used to mitigate risks in the supply receiver's business plan.

FIG. 1 illustrates a functional block diagram of an exemplary total manufacturing planning management system environment 100 in which a computing device 122 is configured, in accordance with an embodiment of the present disclosure. Computing device 122 may include resource tools 140, and a TMPM system 150 which includes a quality monitor 110, a planning controller 120, supplier component quality trend data 125A, 125B, 125C for each supplier, a plan analyzer 130, triggers 135, and thresholds 145, all of which may be stored, for example, on a computer readable storage medium, such as computer readable storage medium (media) 330 (FIG. 3), portable computer readable storage medium (media) 370, and/or RAM(S) 322.

Figure 3:
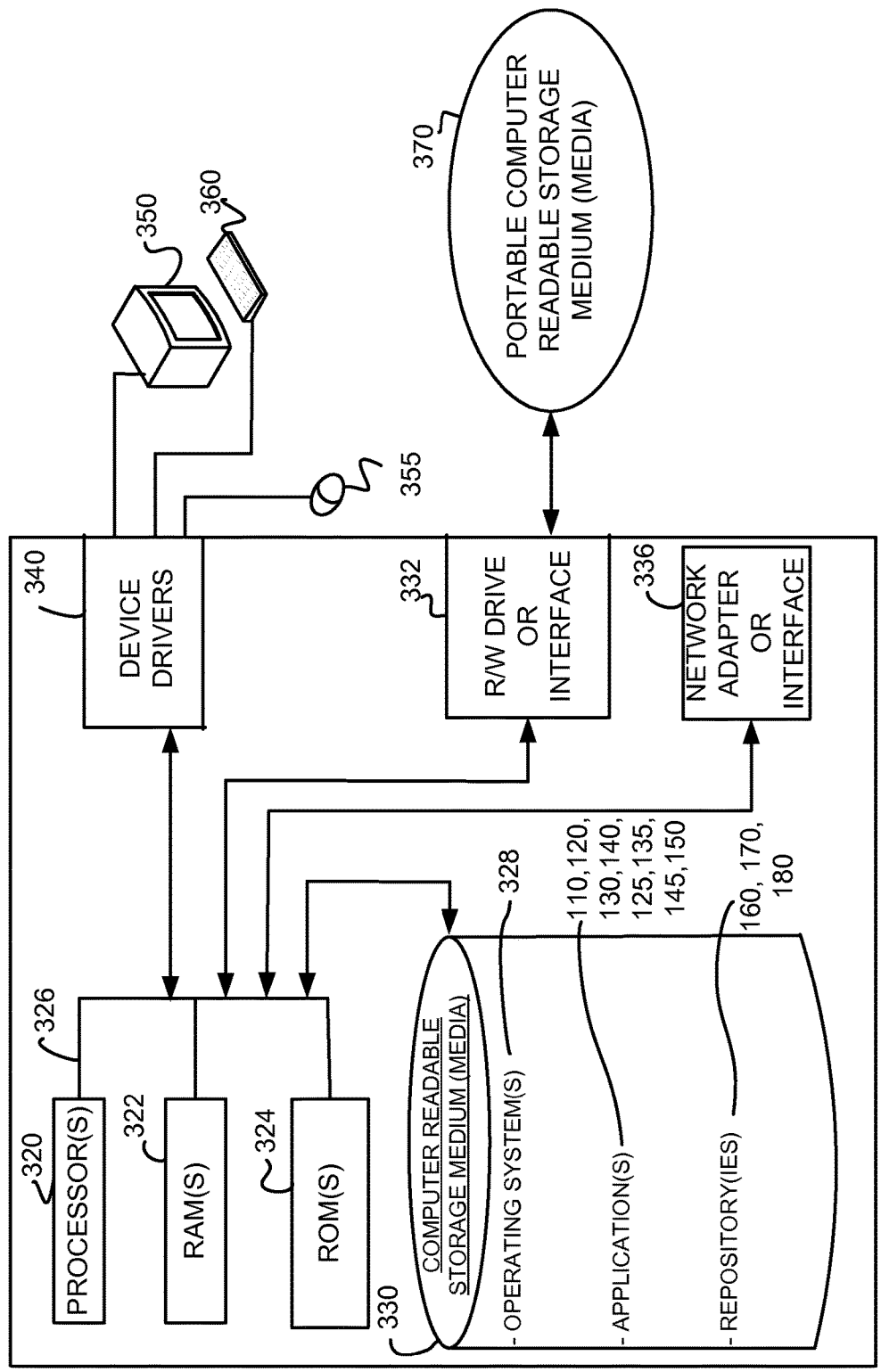
FIG. 3 depicts a block diagram of components of a computing device, in accordance with an embodiment of the disclosure.

Computing device 122, may in various embodiments, be connected to a plurality of warehoused and real-time supplier quality data 160A, 160B, 160C from manufacturing suppliers 199A, 199B, and 199C respectively, warehoused and real-time manufacturing quality data 170 from the product manufacturer building the product using components supplied by suppliers 199A, 199B, and 199C, and the manufacturer's business plan 180, all of which may be locally attached to computing device 122 or may be externally accessed through a network 188 (for example, the Internet, a local area network, or other wide area network or wireless network) and network adapter or interface 336 (FIG. 3). The network may comprise copper wires, optical fibers, wireless transmission, routers, firewalls, switches, gateway computers, and/or edge servers. Supplier quality data 160 and manufacturer product quality data 170 may be stored in a database, a database appliance, the cloud, or any storage accessible to computing device 122.

Supplier quality data 160 may include, but is not limited, to real-time and historical supplier inventory status, supplier yield data, first pass yield metrics, defect data, market quality data, and first pass quality metrics. Product quality data 170 may include, but is not limited to, manufacturer product inventory status, manufacturer product yield data, manufacturer product cost data, manufacturer product rework data, manufacturer product problem logs, manufacturer product first pass yield metrics, and manufacturer product first pass quality metrics.

In various embodiments, quality monitor 110 may monitor manufacturing product quality data 170 as well as supplier quality data 160 from a plurality of suppliers. In various embodiments, quality monitor 110 may "pull" a snapshot of current manufacturing product quality data 170 and supplier quality data 160 on a regular pre-defined interval. In certain embodiments, the monitoring interval between pulls may be configurable and may be measured in any unit appropriate for the manufacturer, such as days, hours, seconds, or milliseconds. In various embodiments, a randomizing element may be added to the interval, in order to spot check various build runs within the monitoring interval and to pull the quality data for that randomly selected component lot. Randomizing the component lot sampled may allow the TMPM system to quickly identify potential component quality or yield issues. In various embodiments, the randomizing element may be configurable. In certain embodiments, the randomizing element may be a random number generator that uses the bounds of the interval to select the day, hour, second, or millisecond within the interval to pull component quality data.

In various embodiments in which a manufacturer has introduced business plan changes such as engineering changes, new components, new materials, or new suppliers, quality monitor 110 may pull the first pass yield and/or first pass quality information on randomly selected supplier first yield lots in addition to the timed interval pulls.

In various embodiments, quality monitor 110 may use warehoused historical quality data to determine an appropriate interval to pull a particular supplier's quality data. If, for example, a supplier's historical quality data shows seasonal quality problems, quality monitor 110 may increase the monitoring frequency for that supplier just prior to, and for the duration of the problem prone season.

In other embodiments, quality monitor 110 may establish a "publish and subscribe" interface to receive all quality data updates as they are stored in manufacturing product quality data 170 and supplier quality data 160. In various other embodiments, quality monitor 110 may receive supplier quality data 160 whenever the supplier "pushes" quality data 160 to established receivers. The pushed data may include all quality data since the last push or may include only a snapshot of the quality data for the latest build run. Quality monitor 110 may pass control to planning controller 120 each time new data is collected.

Planning controller 120 may store the supplier quality data 160 collected by quality monitor 110 in the quality trend data 125A, 125B, 125C for that supplier. Quality trend data 125 may include data required for trending, such as date, time, component lot, component lot yield, and component lot defect rate. Planning controller 120 may utilize the stored quality trend data 125 and the real-time supplier quality data 160 collected by quality monitor 110 to trend supplier quality and yield, and to determine if the real-time trend indicates the manufacturer's existing business plan 180 should be re-evaluated. The manufacturer's business plan 180 may include, but is not limited to, inventory levels, part order planning, completion rates, and production schedules. An outdated business plan that doesn't reflect the real-time trend in supplier quality may affect profitability due to, for example, insufficient part inventories, elongated product manufacturing cycle time, increased order tear-down rate, delayed build plan actual completion rate, and increased manufacturing cost. Components with poor quality or insufficient supply may cost the manufacturer extra when, for example, extra orders need to be built or orders need to be torn down and rebuilt. These extra costs may risk the manufacturer's profit.

In various embodiments, planning controller 120 may decide if the existing business plan 180 needs to be re-evaluated in light of the real-time data collected by quality monitor 110. Planning controller 120 may, in various embodiments, determine if the business plan 180 needs to be re-evaluated by checking if any quality event triggers (described below) have occurred, any quality thresholds (described below) have been exceeded, or any yield thresholds (either high or low) have been exceeded.

Quality event triggers, in various embodiments, may be stored in triggers 135. Triggering a quality event trigger may indicate a potential risk to the manufacturer's business plan 180 and may indicate to planning controller 120 that the manufacturer's current business plan 180 may need to be analyzed with regard to the collected quality data. Quality event triggers in triggers 135 may include, but are not limited to, exceeding a quality target level, exceeding a target level of first article inspection failures, exceeding a target percentage of component defects, and exceeding a target level of supplier failures. Quality event triggers in triggers 135 may be defined by the manufacturer and may be defined for one or more suppliers 199. Target levels and target percentages for each quality event trigger may be stored in thresholds 145.

Thresholds 145 may include the target level values for each of the quality event triggers in triggers 135 in addition to trend thresholds and other quality threshold values. Thresholds 145 may include, but is not limited to, a target actual manufacturing parts consumption threshold value, a target manufacturing order release threshold value, a contracted supplier first pass rejection rate value, a target manufacturing defect rate value, cost threshold values, defect rate trend threshold value, yield trend threshold value, rework trend threshold value, contracted supplier high and low yield threshold values, contracted supplier high and low quality threshold values, and supplier delivery delay threshold value. In certain embodiments, quality threshold values may be a percentage of the total rather than a set value. In certain embodiments, the quality threshold values, in thresholds 145, may be configurable and may be component and supplier 199 dependent. Exceeding a trend threshold value or a quality threshold value may indicate a potential risk to the manufacturer's business plan 180 and may indicate to planning controller 120 that the manufacturer's current business plan 180 may need to be re-evaluated with regard to the collected quality data.

In various embodiments, planning controller 120 may use the quality trend data 125 to trend two or more quality data pulls collected by quality monitor 110 to determine if the quality or yield of the supplier is trending down. If the supplier's change in quality has exceeded the quality threshold value for trending in thresholds 145, planning controller 120 may pass control to plan analyzer 130 to assess the risk in the current plan and make plan adjustment recommendations. If the quality of the supplier is trending up and has exceeded contracted quality threshold values, various embodiments of planning controller 120 may pass control to plan analyzer 130 to assess the current business plan 180 and make recommendations. An exemplary recommendation due to quality trending up may be to increase the planned production yield and reduce expected rework.

In various embodiments, planning controller 120 may compare real-time quality trends against historical supplier trends. If prior quality problems existed for the supplier and the real-time trends minor historical trends, planning controller 120 may pass control to plan analyzer 130, with both real-time and historical trend data, to assess the plan risk and make plan adjustment recommendations.

In various embodiments, planning controller 120 may track individual quality event triggers to determine if any quality event triggers have met or exceeded their target level value in thresholds 145. If a quality event trigger has met or exceeded its target level value, planning controller 120 may pass control to plan analyzer 130 to assess the plan risk and make plan adjustment recommendations.

Plan analyzer 130 may, in various embodiments, be a complex event processing tool to analyze the data collected by quality monitor 110, supplier historical data and trend data, in quality trend data 125, in real-time to identify any financial impact to the business due to the triggers, patterns, or trends identified by planning controller 120. Plan analyzer 130 may perform a regression analysis on the data, predictive analysis on the data, or any other analysis scheme that may allow plan analyzer 130 to evaluate the current business plan 180 with regard to the real-time, trend, and historical quality data. Plan analyzer 130 may determine if the financial impact to the current business plan 180 with regard to the real-time, trend, and historical quality data exceeds a cost threshold value (either high or low threshold value) in thresholds 145. If the cost threshold value is exceeded, plan analyzer 130 may recommend business plan 180 adjustments, such as increasing component orders from an alternate suppliers, increasing orders for a particular part number, and reducing rework estimates that may provide cost savings and/or increased production yields.

Plan analyzer 130 may create a warning report highlighting recommended business plan 180 adjustments, may provide input to a business planning dashboard to display recommended adjustments to the business plan 180 and warnings, or may adjust the affected business plans 180 automatically through resource tools 140.

In various embodiments, resource tools 140 may receive adjustment values from plan analyzer 130 and may generate new resource plans for the resources, within the overall business plan 180, automatically providing real-time business plan updates that may save the manufacturer money, time, and customer satisfaction. Resource plans managed by resource tools 140 may include, but are not limited to, inventory plans, future part number plans, part ordering plans, and production rate plans.

Computing device 122 represents a computing device, system or environment, and may be a laptop computer, notebook computer, personal computer (PC), desktop computer, tablet computer, thin client, mobile phone or any other electronic device or computing system capable of performing the required functionality of embodiments of the disclosure. Computing device 122 may include internal and external hardware components, as depicted and described in further detail with respect to FIG. 3. In other various embodiments of the present disclosure, computing device 122 may represent a computing system utilizing clustered computers and components to act as a single pool of seamless resources. In general, computing device 122 is representative of any programmable electronic devices or combination of programmable electronic devices capable of executing machine-readable program instructions in accordance with an embodiment of the disclosure.

Figure 2:
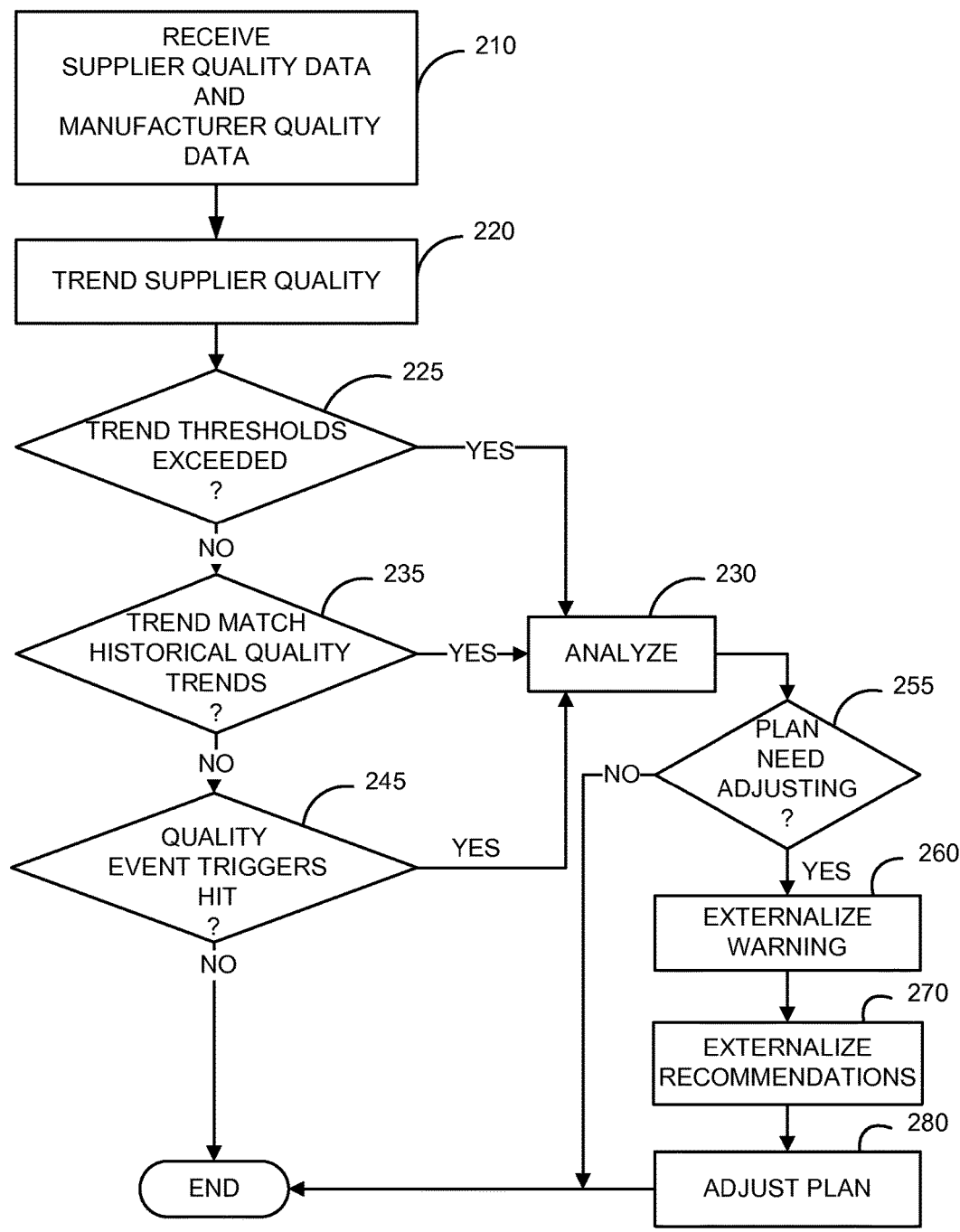
FIG. 2 is a flowchart illustrating a total manufacturing planning management system, in accordance with an embodiment of the disclosure.

FIG. 2 is a flowchart illustrating a total manufacturing planning management system, in accordance with an embodiment of the disclosure. In various embodiments, quality monitor 110 may, at 210, receive real-time supplier quality data 160 from a plurality of suppliers producing components incorporated in a manufacturer produced product. The received real-time supplier quality data 160 may include supplier defect data, supplier yield data, and supplier market quality data. Quality monitor 110 may also receive real-time manufacturer product quality data 170 from the manufacturer.

Planning controller 120 may receive the quality data collected by quality monitor 110 and store some or all of the supplier quality data 160 in trends 125. Planning collector 120 may use the saved and real-time quality data to trend, at 220, the supplier quality and yields. If planning controller 120 determines, at 225, that the quality or yields have trended either up or down exceeding a trend threshold value, planning controller 120 may pass control to plan analyzer 130 to determine if the exceeded threshold may affect the profitability of the current business plan 180.

If planning controller 120 determines, at 225, that the trends have not exceeded any trend thresholds, planning controller 120 may, at 235, determine if the trends match any historical trends that have risked the business plan in the past. If planning controller 120 determines, at 235, that the trends do match historical quality problem trends, planning controller 120 may pass control to plan analyzer 130 to determine if the real-time trend that matches a historical quality problem trend may affect the profitability of the current business plan 180.

If planning controller 120 determines, at 235, that the trends do not match any historical quality problem trends, planning controller 120 may, at 245, determine if any quality event triggers have been hit. If planning controller 120 determines, at 245, that one or more quality event triggers have been hit, planning controller 120 may pass control to plan analyzer 130 to determine if the quality event triggers that have been hit affect the profitability of the current business plan 180.

If planning controller 120 determines, at 245, that no quality event triggers have been hit, planning controller 120 may determine the business plan 180 is not at risk and ends processing until additional quality data is received.

If plan analyzer 130 receives control from planning controller 120, plan analyzer 130 may, at 230, analyze the financial impact to the manufacturer's business plan 180 using supplier quality data 160 received, product quality data 170 received, trends stored by planning controller 120, and warehoused historical data.

If plan analyzer 130 determines, at 255, that there is a financial impact to the manufacturer's business plan 180, plan analyzer 130 may, at 260, externalize a warning that the business plan 180 needs to be adjusted in light of the real-time data, may, at 270, externalize recommended adjustments to the business plan 180, and may, at 280, pass control to resource tools 140 to make the recommended adjustments to the business plan 180. Processing ends until additional quality data is received.

If plan analyzer 130 determines, at 255, that there is no financial impact to the manufacturer's business plan 180, processing ends until additional quality data is received.

FIG. 3 depicts a block diagram of components of computing device 122 of FIG. 1, in accordance with an embodiment of the disclosure. It should be appreciated that FIG. 3 provides only an illustration of one implementation and does not imply any limitations with regard to the environments in which different embodiments may be implemented. Many modifications to the depicted environment may be made.

Computing device 122 can include one or more processors 320, one or more computer-readable RAMs 322, one or more computer-readable ROMs 324, one or more readable storage medium 330, device drivers 340, read/write drive or interface 332, and network adapter or interface 336, all interconnected over a communications fabric 326. Communications fabric 326 can be implemented with any architecture designed for passing data and/or control information between processors (such as microprocessors, communications and network processors, etc.), system memory, peripheral devices, and any other hardware components within a system.

One or more operating systems 328, TMPM systems 150, quality monitors 110, planning controllers 120, plan analyzers 130, resource tools 140, trends 125, triggers 135, thresholds 145, product quality data 170, manufacturer business plans 180, and supplier quality data 160 are stored on one or more of the computer-readable storage medium 330 for execution by one or more of the processors 320 via one or more of the respective RAMs 322 (which typically include cache memory). In the illustrated embodiment, each of the computer readable storage medium 330 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer readable storage medium that can store a computer program and digital information.

Computing device 122 can also include a R/W drive or interface 332 to read from and write to one or more portable computer readable storage medium 370. A TMPM system 150, quality monitor 110, planning controller 120, plan analyzer 130, resource tools 140, trends 125, triggers 135, thresholds 145, product quality data 170, manufacturer business plan 180, and supplier quality data 160 can be stored on one or more of the portable computer readable storage medium 370, read via the respective R/W drive or interface 332, and loaded into the respective computer readable storage medium 330.

Computing device 122 can also include a network adapter or interface 336, such as a TCP/IP adapter card or wireless communication adapter (such as a 4G wireless communication adapter using OFDMA technology). TMPM system 150, quality monitor 110, planning controller 120, plan analyzer 130, resource tools 140, trends 125, triggers 135, thresholds 145, product quality data 170, manufacturer business plan 180, and supplier quality data 160 can be downloaded to the computing device from an external computer or external storage device via a network (for example, the Internet, a local area network or other, wide area network or wireless network) and network adapter or interface 336. From the network adapter or interface 336, the programs are loaded into the computer readable storage medium 330. The network may comprise copper wires, optical fibers, wireless transmission, routers, firewalls, switches, gateway computers, and/or edge servers.

Computing device 122 can also include a display screen 350, a keyboard or keypad 360, and a computer mouse or touchpad 355. Device drivers 340 interface to display screen 350 for imaging, to keyboard or keypad 360, to computer mouse or touchpad 355, and/or to display screen 350 for pressure sensing of alphanumeric character entry and user selections. The device drivers 340, R/W drive or interface 332, and network adapter or interface 336 can comprise hardware and software (stored in computer readable storage medium 330 and/or ROM 324).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for managing a manufacturer's business plan in real-time, the method comprising:
   pulling, by a computer, a snapshot of real-time quality data from a supplier producing a component incorporated in a product produced by the manufacturer at pre-defined intervals, the real-time quality data associated with a measure of an aspect of quality of the components;
   pulling, by the computer, a random snapshot of real-time quality data from the supplier during a random interval within a pre-defined interval of the pre-defined intervals, the random interval comprising a time, defined by a random number generator and within bounds of the pre-defined interval, to pull the random snapshot;
   pulling, by the computer, a first pass yield data from the supplier on a randomly selected first yield lot for the supplier in response to the manufacturer introducing a business plan change;
   pulling, by the computer, a snapshot of real-time quality data from the manufacturer producing the product at pre-defined intervals, the real-time quality data associated with a measure of an aspect of quality of the product;
   pulling, by the computer, a random snapshot of real-time quality data from the manufacturer during a random interval within a pre-defined interval of the pre-defined intervals, the random interval comprising a time, defined by a random number generator and within bounds of the pre-defined interval, to pull the random snapshot;
   determining, by the computer, whether a statistical trend in one of the supplier quality and supplier yield from the received real-time quality data from the supplier exceeds a trend threshold;
   triggering, by the computer and in response to the statistical trend exceeding the trend threshold, an analysis of a financial impact to the manufacturer using the real-time quality data received from the supplier, the real-time quality data received from the manufacturer, historical supplier quality data, historical manufacturer quality data, and the manufacturer's business plan in response to one or more of:
      determining, by the computer, that the real-time quality data received from the supplier exceeds a quality target metric for the supplier,
      determining, by the computer, that the real-time quality data received from the supplier exceeds a quality target metric for the component produced by the supplier, and
      determining, by the computer, that the determined statistical trend exceeds a threshold value,
   based on the analysis results indicating a financial impact exceeding a threshold:
      externalizing, by the computer, a warning;
      externalizing, by the computer, analysis recommended changes to the manufacturer's business plan; and
      changing, by the computer, the manufacturer's business plan with the analysis recommended changes;
   ceasing, by the computer, processing of the real-time quality data received from the supplier in response to one or more of the analysis of the financial impact to the manufacturer not being triggered and the analysis results not indicating a financial impact that exceeds the threshold;
   receiving, by the computer, additional real-time quality data from the supplier; and
   resuming, by the computer, processing of the real-time quality data from the supplier in response to receiving additional real-time quality data from the supplier.

2. The method according to claim 1, wherein the real-time quality data from the supplier is received on a scheduled interval.

3. The method according to claim 2, wherein the scheduled interval is determined by at least one of:
   a pre-defined time value;
   a configurable time value;
   a randomly generated time value; and
   a seasonal value, the seasonal value based on historical seasonal quality trends.

4. The method according to claim 1, wherein the real-time quality data from the supplier includes:
   supplier defect data;
   supplier yield data; and
   supplier market quality data.

5. The method according to claim 1, wherein the quality target metric for the supplier includes:
   number of supplier defects;
   percentage of supplier defects;
   number of supplier delivery failures; and
   length of supplier delivery delay.

6. The method according to claim 1, wherein the quality target metric for the component produced by the supplier includes:
- number of first article inspection failures;
- percentage of first article inspection failures;
- number of component defects; and
- percentage of component defects.

7. The method according to claim 1, wherein determining a statistical trend in the received real-time quality data from the supplier further comprises:
- determining, by the computer, a statistical trend in the supplier component cost;
- determining, by the computer, a statistical trend in the supplier component yield;
- determining, by the computer, a statistical trend in the supplier component market quality;
- determining, by the computer, a statistical trend in the supplier component first article inspection failure rate; and
- determining, by the computer, a statistical trend in the supplier component first article inspection yield rate.

8. A computer program product for managing a manufacturer's business plan in real-time, the computer program product comprising one or more computer readable storage medium and program instructions stored on at least one of the one or more computer readable storage medium, the program instructions comprising:
- program instructions to pull, by a computer, a snapshot of real-time quality data from a supplier producing a component incorporated in a product produced by the manufacturer at pre-defined intervals, the real-time quality data associated with a measure of an aspect of quality of the component;
- program instructions to pull, by the computer, a random snapshot of real-time quality data from the supplier during a random interval within a pre-defined interval of the pre-defined intervals, the random interval comprising a time, defined by a random number generator and within bounds of the pre-defined interval, to pull the random snapshot;
- program instructions to pull, by the computer, a first pass yield data from the supplier on a randomly selected first yield lot for the supplier in response to the manufacturer introducing a business plan change;
- program instructions to pull, by the computer, a snapshot of real-time quality data from the manufacturer producing the product at pre-defined intervals, the real-time quality data associated with a measure of an aspect of quality of the product;
- program instructions to pull, by the computer, a random snapshot of real-time quality data from the manufacturer during a random interval within a pre-defined interval of the pre-defined intervals, the random interval comprising a time, defined by a random number generator and within bounds of the pre-defined interval, to pull the random snapshot;
- program instructions to determine, by the computer, whether a statistical trend in one of the supplier quality and supplier yield from the received real-time quality data from the supplier exceeds a trend threshold;
- program instructions to trigger, by the computer and in response to the statistical trend exceeding the trend threshold, an analysis of a financial impact to the manufacturer using the real-time quality data received from the supplier, the real-time quality data received from the manufacturer, historical supplier quality data, historical manufacturer quality data, and the manufacturer's business plan in response to program instructions determining one or more of:
  - the real-time quality data received from the supplier exceeds a quality target metric for the supplier,
  - the real-time quality data received from the supplier exceeds a quality target metric for the component produced by the supplier, and
  - the determined statistical trend exceeds a threshold value,
- based on the analysis results indicating a financial impact exceeding a threshold:
  - program instructions to externalize, by the computer, a warning;
  - program instructions to externalize, by the computer, analysis recommended changes to the manufacturer's business plan; and
  - program instructions to change, by the computer, the manufacturer's business plan with the analysis recommended changes;
- program instructions to cease, by the computer, processing of the real-time quality data received from the supplier in response to one or more of the analysis of the financial impact to the manufacturer not being triggered and the analysis results not indicating a financial impact that exceeds the threshold;
- program instructions to receive, by the computer, additional real-time quality data from the supplier; and
- program instructions to resume, by the computer, processing of the real-time quality data from the supplier in response to receiving additional real-time quality data from the supplier.

9. The computer program product according to claim 8, wherein the real-time quality data from the supplier is received on a scheduled interval.

10. The computer program product according to claim 9, wherein the scheduled interval is determined by at least one of:
- a pre-defined time value;
- a configurable time value;
- a randomly generated time value; and
- a seasonal value, the seasonal value based on historical seasonal quality trends.

11. The computer program product according to claim 8, wherein the real-time quality data from the supplier includes:
- supplier defect data;
- supplier yield data; and
- supplier market quality data.

12. The computer program product according to claim 8, wherein the quality target metric for the supplier includes:
- number of supplier defects;
- percentage of supplier defects;
- number of supplier delivery failures; and
- length of supplier delivery delay.

13. The computer program product according to claim 8, wherein the quality target metric for the component produced by the supplier includes:
- number of first article inspection failures;
- percentage of first article inspection failures;
- number of component defects; and
- percentage of component defects.

14. The computer program product according to claim 8, wherein program instructions to determine a statistical trend in the received real-time quality data from the supplier further comprises:
- program instructions to determine, by the computer, a statistical trend in the supplier component cost;

program instructions to determine, by the computer, a statistical trend in the supplier component yield;
program instructions to determine, by the computer, a statistical trend in the supplier component market quality;
program instructions to determine, by the computer, a statistical trend in the supplier component first article inspection failure rate; and
program instructions to determine, by the computer, a statistical trend in the supplier component first article inspection yield rate.

15. A computer system for managing a manufacturer's business plan in real-time, the computer system comprising one or more processors, one or more computer readable memories, one or more computer readable tangible storage medium, and program instructions stored on at least one of the one or more storage medium for execution by at least one of the one or more processors via at least one of the one or more memories, the program instructions comprising:
    program instructions to pull, by a computer, a snapshot of real-time quality data from a supplier producing a component incorporated in a product produced by the manufacturer at pre-defined intervals, the real-time quality data associated with a measure of an aspect of quality of the component;
    program instructions to pull, by the computer, a random snapshot of real-time quality data from the supplier during a random interval within a pre-defined interval of the pre-defined intervals, the random interval comprising a time, defined by a random number generator and within bounds of the pre-defined interval, to pull the random snapshot;
    program instructions to pull, by the computer, a first pass yield data from the supplier on a randomly selected first yield lot for the supplier in response to the manufacturer introducing a business plan change;
    program instructions to pull, by the computer, a snapshot of real-time quality data from the manufacturer producing the product at pre-defined intervals, the real-time quality data associated with a measure of an aspect of quality of the product;
    program instructions to pull, by the computer, a random snapshot of real-time quality data from the manufacturer during a random interval within a pre-defined interval of the pre-defined intervals, the random interval comprising a time, defined by a random number generator and within bounds of the pre-defined interval, to pull the random snapshot;
    program instructions to determine, by the computer, whether a statistical trend in one of the supplier quality and supplier yield from the received real-time quality data from the supplier exceeds a trend threshold;
    program instructions to trigger, by the computer and in response to the statistical trend exceeding the trend threshold, an analysis of a financial impact to the manufacturer using the real-time quality data received from the supplier, the real-time quality data received from the manufacturer, historical supplier quality data, historical manufacturer quality data, and the manufacturer's business plan in response to program instructions determining one or more of:
        the real-time quality data received from the supplier exceeds a quality target metric for the supplier,
        the real-time quality data received from the supplier exceeds a quality target metric for the component produced by the supplier, and
        the determined statistical trend exceeds a threshold value,
    based on the analysis results indicating a financial impact exceeding a threshold:
        program instructions to externalize, by the computer, a warning;
        program instructions to externalize, by the computer, analysis recommended changes to the manufacturer's business plan; and
        program instructions to change, by the computer, the manufacturer's business plan with the analysis recommended changes;
    program instructions to cease, by the computer, processing of the real-time quality data received from the supplier in response to one or more of the analysis of the financial impact to the manufacturer not being triggered and the analysis results not indicating a financial impact that exceeds the threshold;
    program instructions to receive, by the computer, additional real-time quality data from the supplier; and
    program instructions to resume, by the computer, processing of the real-time quality data from the supplier in response to receiving additional real-time quality data from the supplier.

16. The computer system according to claim 15, wherein the real-time quality data from the supplier is received on a scheduled interval.

17. The computer system according to claim 16, wherein the scheduled interval is determined by at least one of:
    a pre-defined time value;
    a configurable time value;
    a randomly generated time value; and
    a seasonal value, the seasonal value based on historical seasonal quality trends.

18. The computer system according to claim 15, wherein the quality target metric for the supplier includes:
    number of supplier defects;
    percentage of supplier defects;
    number of supplier delivery failures; and
    length of supplier delivery delay.

19. The computer system according to claim 15, wherein the quality target metric for the component produced by the supplier includes:
    number of first article inspection failures;
    percentage of first article inspection failures;
    number of component defects; and
    percentage of component defects.

20. The computer system according to claim 15, wherein program instructions to determine a statistical trend in the received real-time quality data from the supplier further comprises:
    program instructions to determine, by the computer, a statistical trend in the supplier component cost;
    program instructions to determine, by the computer, a statistical trend in the supplier component yield;
    program instructions to determine, by the computer, a statistical trend in the supplier component market quality;
    program instructions to determine, by the computer, a statistical trend in the supplier component first article inspection failure rate; and
    program instructions to determine, by the computer, a statistical trend in the supplier component first article inspection yield rate.

* * * * *